Feb. 23, 1932.　　　J. W. CHRISTIE　　　1,846,471
ENDLESS TRACK FOR TRUCK TRACTORS
Original Filed Feb. 23, 1929
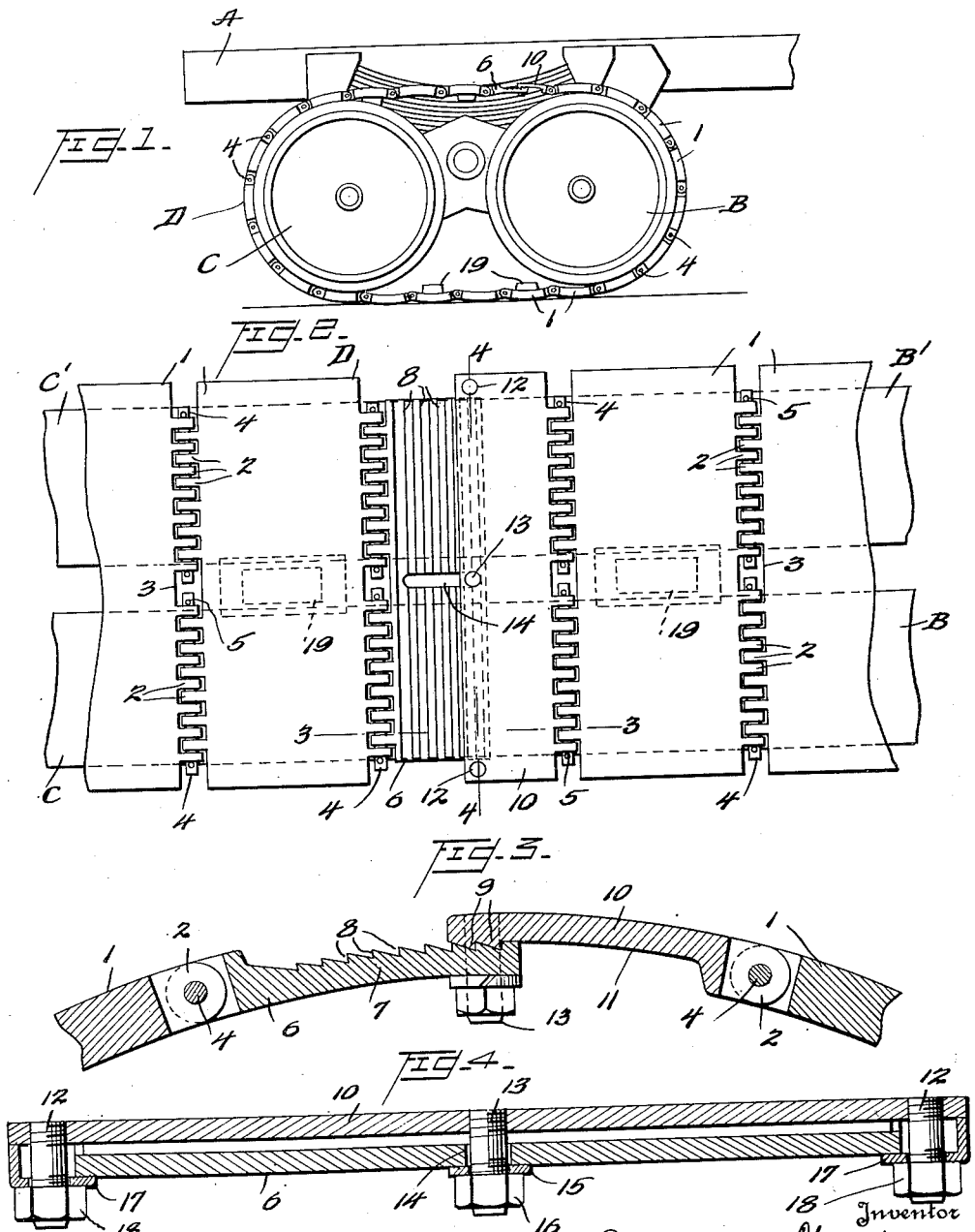

Patented Feb. 23, 1932

1,846,471

UNITED STATES PATENT OFFICE

JOHN WALTER CHRISTIE, OF AVON, NEW JERSEY, ASSIGNOR, BY MESNE ASSIGNMENTS, TO BROWNING CRANE COMPANY, OF CLEVELAND, OHIO, A CORPORATION OF OHIO

ENDLESS TRACK FOR TRUCK TRACTORS

Original application filed February 23, 1929, Serial No. 342,003. Divided and this application filed July 31, 1929. Serial No. 382,519.

Generically this inventon relates to motor vehicles, but it more especially comprehends an eight-wheel traction structure and drive mechanism comprising a four-wheel unit on each side of the chassis and an endless track adapted for interchangeable connection therewith and is a divisional application of my application Serial No. 342,003 filed February 23, 1929, which has matured into Patent No. 1,736,391, Nov. 19, 1929, for drives for motor vehicles.

An important object of this invention is the provision of an endless track for each four-wheel traction unit of an eight-wheel structure and adapted for expeditious interchangeable connection therewith, whereby the vehicle is convertible from a road vehicle to one of the track-laying type, as desired.

One of the principal objects of this invention is the provision of an endless chain structure adapted for interchangeable connection with each four-wheel traction unit of an eight-wheel drive mechanism, comprising novel means for tensioning the track about the wheels and additional means for locking the meeting ends of the track together in such tensioned position.

Another important object of this invention is the provision of an endless track adapted to be frictionally mounted on the road wheel units of a motor vehicle tractor, comprising adjustable means for tensioning the track on the units, including complemental interacting serrated portions and means for locking said portions in adjusted position, whereby the vehicle is easily converted from a road vehicle into one of the track-laying type.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a side view of the rear wheels of a vehicle with track attached;

Fig. 2 is a plan view of a portion of the track, showing the two complemental connecting links and wheels in dotted outline.

Fig. 3 is a section on line 3—3 of Fig. 2.

Fig. 4 is a section taken on the line 4—4 of Fig. 2.

The track structures with which I am familiar have proven deficient when employed in connection with vehicles of the heavy duty traction type, owing to their tendency to become distorted and separated at the jointure when subjected to heavy load torsional strain and torque stresses and the attaching and locking means at all capable of withstanding such strain, being so cumbersome as to preclude the ready tensioning of the chain about the wheels as well as attachment and detachment therefrom and it was to overcome such deficiencies and to provide a chain having adjustable means for tensioning the track, said means including complemental interacting serrated portions for co-acting engagement throughout the entire width of said portions and means for locking said portion in adjusted position, whereby the vehicle is expeditiously convertible from a road vehicle into one of the track-laying type, further increasing the surface contacting area and rendering it possible to transport heavy loads over otherwise impassable roads, that I designed the track structure forming the subject matter of this invention.

In the illustrated embodiment characterizing this invention there is shown a portion of a chassis frame A and complemental pairs of traction wheels B—B' and C—C', respectively, of the type illustrated in the above referred to application, Serial No. 342,003, the said wheel units B—B' and C—C' adapted to have detachably mounted thereon the endless track structure now to be described.

Coming now to the last mentioned structure, there is shown an endless track D comprising links 1 formed along each of their longitudinal edges with projections 2 and providing an extra wide space midway the length of the link as at 3. The projections 2 are apertured and adapted for dovetail engagement with similar projections of the adjacent link, the apertures being properly aligned to receive hinge pins 4 secured by pins 5 providing a hinged connection between the respective links and the track D, and by the use of two pins a flexible hinged connection is provided.

In order to connect the free ends of the chain, the final link 6 at one end is secured by pins 4 as heretofore described, and is reduced as at 7 to form the body portion of less thickness than the links proper and its face is formed with longitudinally extending female serrations 8 adapted to receive the complemental male serrations 9 formed on the under surface of the complemental link 10, which has its under surface reduced as at 11, so that the engaging portions of said links 6 and 10 will be substantially the same thickness as the links proper. Said link 10 is secured to the opposite end of the track by pins 4 as heretofore described, and is provided with bolts 12 at each of its ends and bolt 13 centrally of the link in alignment with bolts 12 threadedly or otherwise suitably secured thereto and adapted to extend downwardly from said link. The link 6 is of less length than link 10, so that bolts 12 project downwardly adjacent the opposite ends of said link and bolt 13 extends through slot 14 in link 6 and is adapted to receive lock member 15 and nut 16. An angle clamp 17 is mounted on each of the bolts 12, the extremity of the perpendicular portion contacting the under surface of link 10 and the end of the lateral portion contacting the under surface of link 6, so that tightening of nuts 18 thereon firmly secures the links 6 and 10 together similar to the tightening of nut 16 with respect to bolt 13.

It will be observed that when the track D is operatively secured about the wheels B and B' and C and C' the bolts 12 will extend on opposite outside edges of the tires of the respective wheels and the bolt 13 will extend intermediate said wheels. Suitably secured by rivets or in any other well known manner to the under surface of links 1 central of their length are the projections 19 adapted to extend between wheels C and C' and B and B' effectually preventing lateral displacement of the track from said wheels.

It will be observed that to convert the road vehicle into one of the track laying type it is but necessary to mount the track on each four wheel unit, bringing the serrations of links 6 and 10 into engagement, and whereby the desired tensioning of the track with respect to the four wheel unit may be expeditiously effected, and said links locked in the desired adjusted position by tightening nuts 16 and 18 as above described. No further operation is necessary to secure the track about the traction unit; frictional engagement of the tires of the traction unit with the inner surface of the chain effects laying thereof without the necessity of employing other means, as will be well understood without further discussion.

From the above it is apparent that I have designed an endless track adapted to be frictionally mounted on the traction unit at each side of a vehicle chassis especially designed for extreme heavy duty, comprising means for expeditiously connecting and adjusting the free ends of the track, so that such ends will be firmly interlocked throughout the entire area of their contact surface engagement, means for locking the co-acting elements in such adjusted position, whereby tearing loose or distortion of the connecting elements will be precluded even under the extreme lateral and torsional stresses incident to heavy load and rough vehicular usage, yet one simple in construction, manufacturable at a reasonable cost and efficient for effecting convertibility of a road vehicle into one of the track-laying type as desired.

Although in practice I have found that the form of my invention illustrated in the accompanying drawings and referred to in the above description as the preferred embodiment, is the most efficient and practical; yet realizing the conditions will necessarily vary, I desire to emphasize that various minor changes in details of construction, proportion and arrangement of parts, may be resorted to within the scope of the appended claim without departing from or sacrificing any of the principles of this invention.

Having thus described my invention, what I desire protected by Letters Patent is as set forth in the following claim:

An endless track for motor vehicles adapted to be frictionally mounted on the traction wheels thereof, adjustable means for tensioning the track on said wheels, said means including links hingedly connected to the free ends of said track, one of said links being of a smaller dimension transversely of the endless track than the other and formed centrally of said dimension with a slot, each of said links being formed with transverse serrations substantially throughout their dimensions transversely of the track and adapted for coacting engagement, means adjacent the edges of said links laterally of the track for locking the links in adjusted position, and additional means coacting with said slot for locking said links centrally of their dimension transversely of the track, whereby lateral and torsional stresses incident to heavy load and rough vehicular usage will not effect loosening or distortion of said connecting links and misalignment of said track.

This specification signed this 21st day of June, A. D. 1929.

JOHN WALTER CHRISTIE.